US009934524B2

(12) United States Patent
McGilliard et al.

(10) Patent No.: US 9,934,524 B2
(45) Date of Patent: Apr. 3, 2018

(54) MODIFYING CONFIGURATIONS ASSOCIATED WITH A HOSTED ELECTRONIC PLATFORM ENVIRONMENT

(71) Applicant: Amazon Technologies, Inc., Seattle, WA (US)

(72) Inventors: Christopher L. McGilliard, Seattle, WA (US); Seema P. Degwekar, Seattle, WA (US); Brian J. Boshes, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 14/942,046

(22) Filed: Nov. 16, 2015

(65) Prior Publication Data

US 2016/0071174 A1 Mar. 10, 2016

Related U.S. Application Data

(63) Continuation of application No. 13/170,213, filed on Jun. 28, 2011, now abandoned.

(51) Int. Cl.
*G06Q 30/00* (2012.01)
*G06Q 30/06* (2012.01)
(52) U.S. Cl.
CPC ............... *G06Q 30/0601* (2013.01)

(58) Field of Classification Search
CPC ........................................ G06Q 30/06–30/08
USPC ............................................... 705/26.1–27.2
See application file for complete search history.

(56) References Cited

U.S. PATENT DOCUMENTS

2009/0132418 A1* 5/2009 Morsillo ............. G06Q 20/102
 705/44
2011/0016014 A1* 1/2011 Tonnison ............. G06Q 30/02
 705/26.2

OTHER PUBLICATIONS

"Liz Claiborne Inc. Embraces Microsoft's Smarter Retailing Initiative, Announces Overhaul of In-Store Technologies" (PR Newswire, Jul. 27, 2004).*

* cited by examiner

*Primary Examiner* — Ethan D Civan
(74) *Attorney, Agent, or Firm* — Thomas | Horstemeyer, LLP

(57) ABSTRACT

Disclosed are various embodiments of a method and system for modifying configurations associated with a hosted electronic platform environment. A request to modify a configuration associated with an entity is obtained. The configuration describes at least one feature including an amount of bandwidth and/or an amount of storage space that is provided to the entity by a hosted service provider. A preview of the modified configuration is provided to the entity. After providing the preview, the configuration is modified.

20 Claims, 7 Drawing Sheets

MODIFYING CONFIGURATIONS ASSOCIATED WITH A HOSTED ELECTRONIC PLATFORM ENVIRONMENT

CROSS-REFERENCE TO RELATED APPLICATION

This application is a continuation of copending U.S. utility application entitled, "GENERATING PREVIEWS OF CHANGES TO VENDOR ACCOUNT CONFIGURATIONS," having Ser. No. 13/170,213, filed Jun. 28, 2011, which is entirely incorporated herein by reference.

BACKGROUND

An electronic commerce system allows users to purchase products online from multiple vendors or sellers. The products are organized in a catalog, which may be organized into categories and subcategories, so that a user can navigate through the hierarchy, search for products, and view information about products. The electronic commerce system facilitates the sale of products by providing a hosted electronic commerce platform for use by a vendor. The platform provides various electronic commerce features which may be combined by vendors in various ways.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a hosted electronic commerce system which supports multiple electronic commerce features. Vendors can choose various combinations of these electronic commerce features, which allows some degree of vendor customization of the electronic commerce platform. In some embodiments, the electronic commerce system uses a set of feature configuration rules to enforce restrictions on the customizations that are available to a vendor. These rules may be driven by technical interoperability concerns, legal concerns, or business considerations. Different rules may be applied to different vendors based on various types of vendor-specific data, such as vendor sales, vendor location, and vendor history with the electronic commerce system operator. The use of feature configuration rules allows automatic approval of changes to a vendor account configuration, even when that change includes feature combinations that are unusual or atypical, since the rules ensure that such combinations are supported by the electronic commerce platform provider.

In some embodiments, when a vendor requests customization of the features in the current vendor configuration, the electronic commerce system provides a preview of the features before performing the customization. This information provided in the preview allows a vendor to fully appreciate the effect of the requested customization. The preview process may also present the vendor with information about additional features. This additional information may prompt the vendor to customize further, generating additional revenue for the operator of the hosted electronic commerce system.

Figure 1:
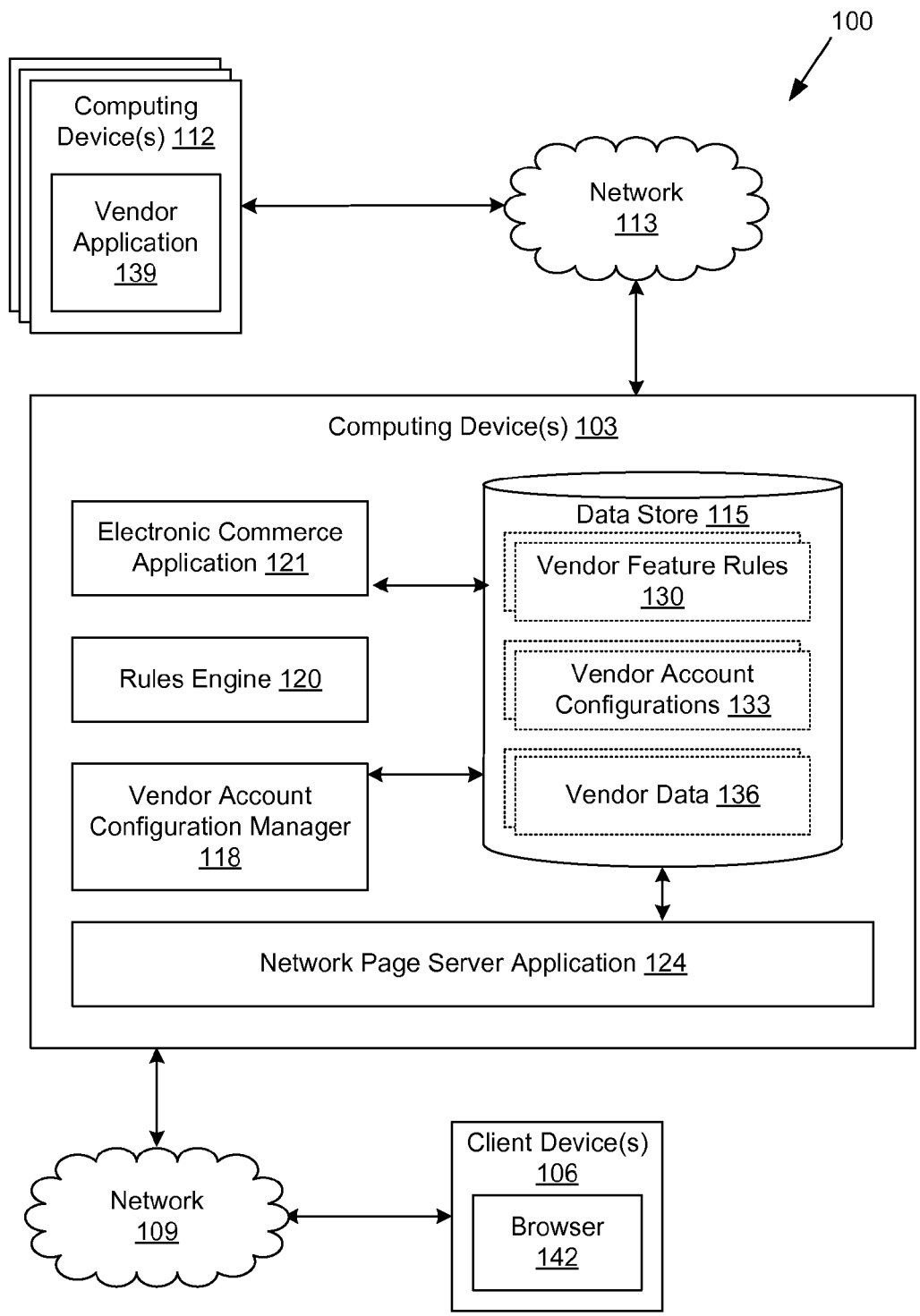
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network environment also includes one or more computing devices 112 in data communication with computing devices 103 by way of a network 113. Each of networks 109, 113 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a vendor account configuration manager 118, a rules engine 120, an electronic commerce application 121, and a network page server application 124. The components executed on the computing device 103 may also include other applications, services, processes, systems, engines, or functionality not discussed in detail herein. The data stored in the data store 115 includes data accessed by the various components executing on the computing device 103, for example, a set of vendor feature rules 130, a set of vendor account configurations 133, and vendor data 136, as well as potentially other data.

The electronic commerce application 121 is executed to facilitate the online purchase of products from an electronic marketplace. Information about the purchasable products may be stored in an electronic catalog (not shown). The electronic commerce application 121 also performs various backend functions associated with the online presence of the electronic marketplace in order to facilitate the online purchase of products.

The network page server application 124 is executed to fetch network pages in response to requests from the client device 106. In some embodiments, the network page server application 124 is a web server which is executed to fetch web pages. The network pages fetched by the network page server application 124 may be dynamically generated or may be static. These network pages include various products from the electronic catalog. An application such as the electronic commerce application 121 may be executed to track user interaction with these network pages, thus building a history of products which a particular user has viewed, obtained through a search, selected, selected for purchase, purchased, selected for evaluation, and/or evaluated. The data derived from this user interaction may be stored as user behavior data (not shown).

The electronic commerce application 121 facilitates the sale of products by vendors by providing a hosted electronic commerce platform for use by a vendor. The platform provides various electronic commerce features from which a vendor can pick and choose, thus allowing some degree of platform customization for each vendor. The electronic commerce platform operator may charge the vendor for any or all of these features. The operator may bundle features together as a package, so that what appears to the vendor to be a single feature (e.g. "Premium Seller Status") is actually a collection of features.

One example of a selectable electronic commerce platform feature is whether the electronic commerce marketplace, which is implemented by the electronic commerce platform operator, is branded by the operator or by the vendor. Some vendors may choose to have customers see the vendor brand even though the electronic commerce application 121 is hosted by and maintained by the electronic commerce platform operator. Other vendors, perhaps those with a brand that is not well-recognized, may choose to have customers see the brand of the electronic commerce platform operator instead. Another example of a selectable electronic commerce platform feature is whether a vendor is allowed to add items to the electronic catalog or only sell items that are already in the catalog. Yet another example of a selectable electronic commerce platform feature is the mechanism a vendor uses to provide inventory data to the electronic commerce application 121, e.g., entry of individual items or batch upload of inventory.

Another example of a selectable electronic commerce platform feature is the entity that fulfills the purchase orders. Some vendors may choose to fulfill purchase orders themselves, while others may choose to have the electronic commerce platform operator not only host the platform but also fulfill the orders. Yet another example of a selectable electronic commerce platform feature is whether the electronic checkout and/or payment process is implemented by the electronic commerce platform operator or by the vendor. Still another example of a selectable electronic commerce platform feature is whether sales tax is collected by the electronic commerce platform operator or by the vendor.

A particular feature may be binary, meaning that the feature is either enabled or disabled, i.e., present or absent on the account. A particular feature may be multi-valued, meaning that the feature is associated with multiple options. One example of a multi-valued feature is the number of catalog items that a vendor is allowed to sell. Another example of a multi-valued feature is the amount of storage space and/or network bandwidth provided to the vendor by the electronic commerce platform operator.

Each vendor maintains an account with the operator of the electronic commerce application 121, and information about which electronic commerce features are provided to a particular vendor are stored in the data store 115 as a vendor account configuration 133. The vendor account configurations 133 are managed by the vendor account configuration manager 118. The vendor account configuration manager 118 fulfills requests from vendors to modify a vendor account configuration 133. In some embodiments, the vendor account configuration manager 118 does not unconditionally grant configuration requests, but instead conditions the decision based on the vendor feature rules 130. In some embodiments, the vendor account configuration manager 118 retrieves the vendor features rule 130 from the data store 115 and applies the vendor features rule 130 directly, while in other embodiments the vendor account configuration manager 118 utilizes the services of the rules engine 120 to access and apply the vendor features rules 130.

The vendor feature rules 130 describe the interaction between various electronic commerce platform features. In some embodiments, a vendor feature rule 130 may describe which features are not permitted to be used together in a vendor account and/or which features are required to be used together in a vendor account. In some embodiments, a vendor feature rules 130 may control which vendors can select or enable particular features, based for example on vendor data 136. Various categories of vendor data 136 may be implemented. An example of a category of vendor data 136 is sales or business data such as gross sales volume, revenue, and/or profits. Another example of a category of vendor data 136 is inventory data, such as listings, products, categories, and/or prices. Yet another example of a category of vendor data 136 is business organization data, such as location, size, number of employees, type of organization, etc.

The operator of the electronic commerce platform may have various reasons for enforcing these restrictions, including, for example, reasons related to technical interoperability or incompatibility, or legal regulations, business considerations (i.e., too expensive to provide a feature to a vendor with a relatively small amount of sales), or other reasons as should be appreciated.

In some embodiments, when a vendor requests modification of the vendor account configuration 133, the vendor account configuration manager 118 provides a preview of selected account features to the vendor before acting on the vendor's request. After the preview, the vendor account configuration manager 118 may require the vendor to confirm the modification before performing the requested modification, or the account may be modified automatically once the preview is provided.

The examples given herein for rule-based processing of changes to account configurations and for the preview of account modifications are described in the context of a relationship between a vendor and an electronic commerce platform provider. However, the principles are also applicable to any sort of hosted service provider and account holders of the hosted service provider.

The computing device 112 is representative of a plurality of computing devices that may be coupled to the network 109. The computing device 112 may comprise, for example, a processor-based system such as a computer system. Such a computer system may be embodied in the form of a desktop computer, a laptop computer, or other devices with like capability. The computing device 112 may be configured to execute a vendor application 139. The vendor application 139 may be executed in a computing device 112, for example, to allow a vendor to select particular electronic commerce platform features provided by the electronic commerce application 121, such as those described herein. The vendor application 139 may also facilitate various other tasks performed by vendors, such as uploading inventory data, adding items to the catalog. The vendor application 139 may be implemented as a standalone application, or may execute in the context of a browser (not shown).

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability. The client device 106 may be configured to execute various applications such as a browser 142. The browser 142 may be executed in a client device 106, for example, to access and render network pages, such as web pages, or other network content served up by a web server, a page server, or other servers. The customer may receive information about products for evaluation and select products for evaluation through these network pages. The client device 106 may be configured to execute applications beyond the browser 142, such as, for example, email applications, instant message applications, and/or other applications.

Figure 2A:
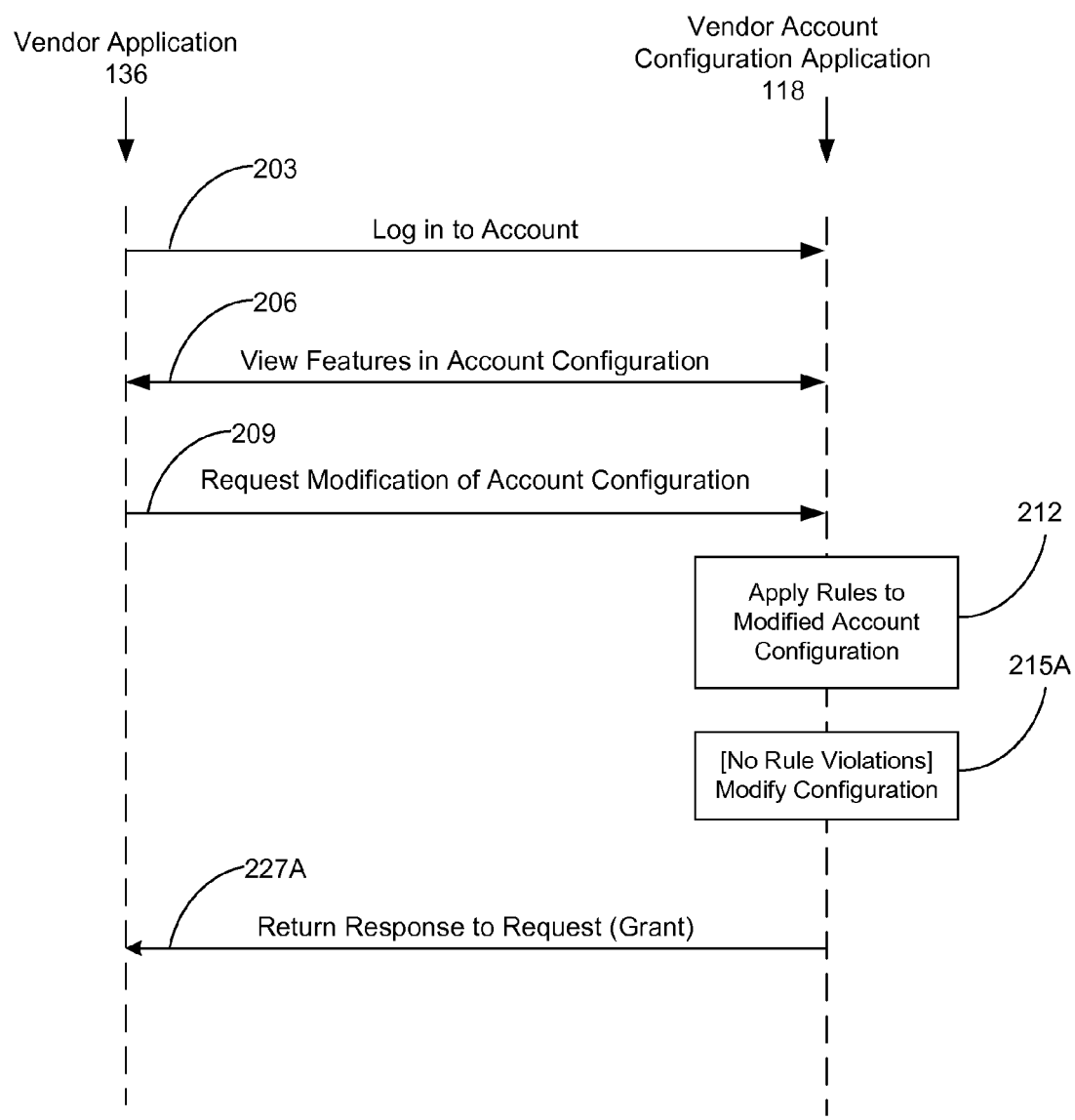
FIGS. 2A-2C are diagrams illustrating interaction between several computing devices in the networked environment of FIG. 1.
Figure 2B:
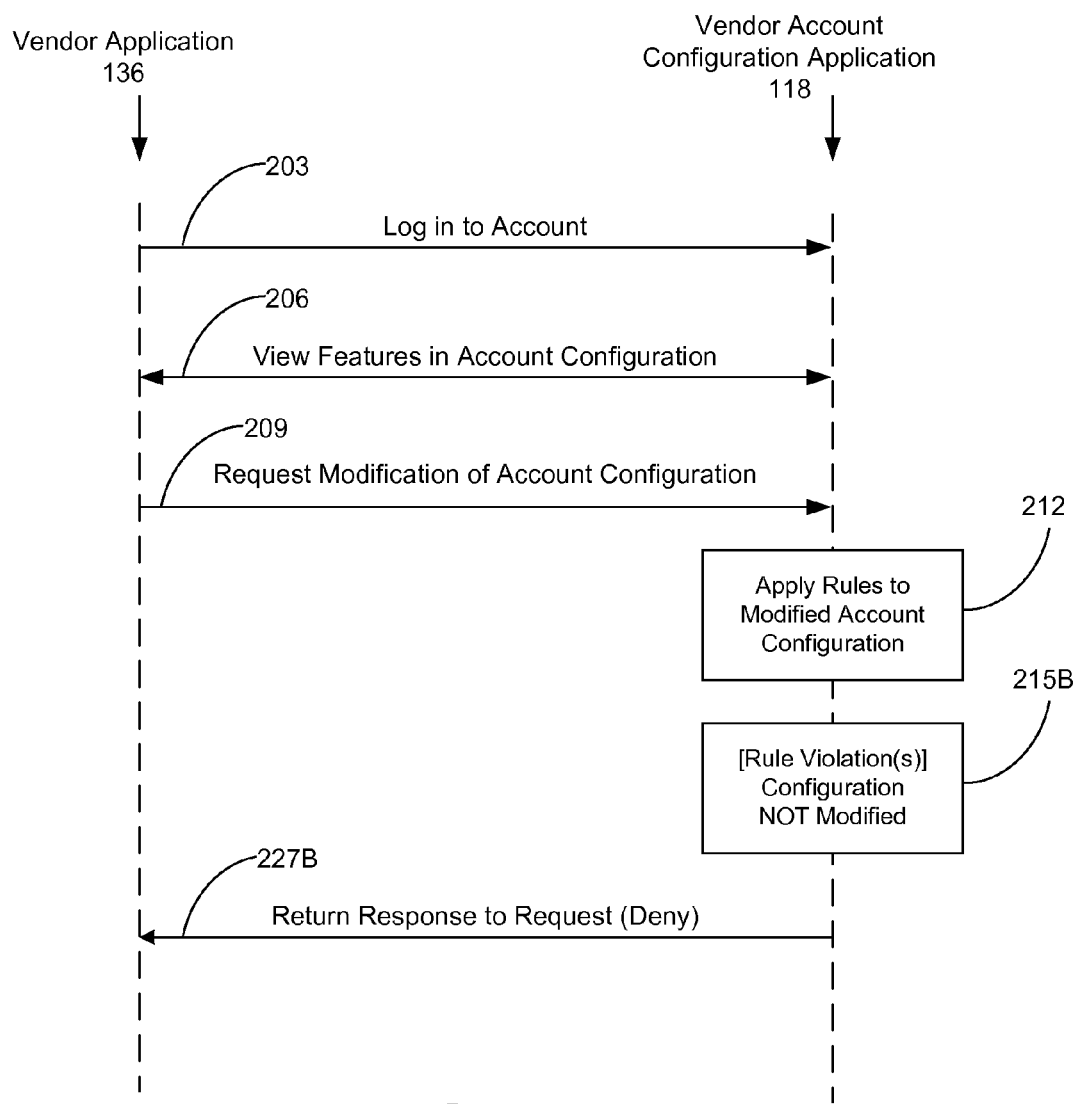
Figure 2C:
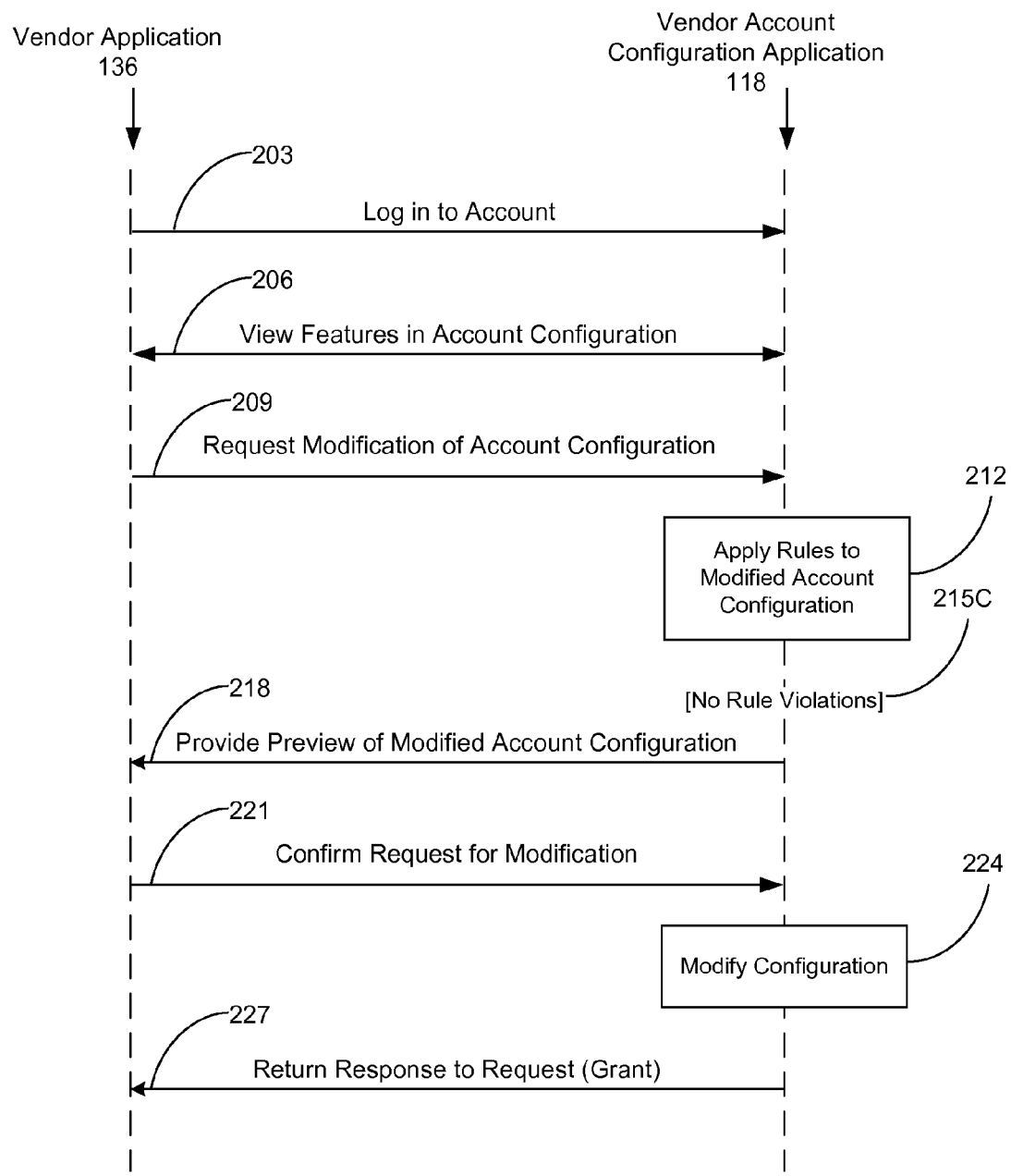

Referring next to FIGS. 2A-2C, a general description is provided for the operation of some of the components of the networked environment 100 of FIG. 1, according to various embodiments of the present disclosure. Each of FIGS. 2A-2C describes a particular workflow scenario between the vendor application 139 and the vendor account configuration manager 118.

FIG. 2A describes a scenario in which a vendor modifies a current account configuration 133. To begin, at step 203, a vendor uses vendor application 139 executing on the computing device 112 to log in to their account. During the log in process, the vendor account configuration manager 118 may utilize vendor identifiers and account credentials stored in vendor data 136.

At step 206, a vendor interacts with the vendor application 139 to view information about selectable electronic commerce platform features. In order to display this information to the vendor, the vendor application 139 communicates with the vendor account configuration manager 118, which may in turn retrieve the current vendor account configuration 133 from the data store 115. In some embodiments, the feature information may be provided to the vendor in the form of network pages, with the cooperation of the network page server application 124. The feature information may describe those features enabled in the current vendor account configuration 133 as well as other features not currently enabled.

The vendor account configuration manager 118 may support features in many different categories. These feature categories include, but are not limited to: order fulfillment, vendor listings; electronic commerce marketplace; electronic commerce storefront; branding for an electronic commerce platform; vendor account setup; and vendor business management (e.g., sales tax collection, gift wrapping, and reporting options).

Having viewed information about selectable electronic commerce platform features, at step 209 the vendor interacts with the vendor application 139 to request modification of the current vendor account configuration 133. The modification may include, for example, adding a new feature to the account, deleting a feature from the account, or modifying a feature already on the account.

At step 212 the vendor account configuration manager 118 uses vendor feature rules 130 to decide whether or not the vendor's request to modify the account configuration 133 will be granted. Rule processing will be described in further detail in connection with FIG. 3.

In the example workflow scenario illustrated in FIG. 2A, the vendor account configuration manager 118 determines that no vendor feature rules 130 will be violated by the modification, so the request is granted. At step 215A, the vendor account configuration manager 118 modifies the vendor account configuration 133 according to the request from the vendor. At step 227A, the vendor account configuration manager 118 returns an indication to the vendor application 139 that the configuration 133 was successfully modified.

Turning now to FIG. 2B, another example of a workflow for modifying a vendor account configuration 133 is shown. In contrast to the scenario in FIG. 2A, the request to modify the configuration is denied in the scenario illustrated in FIG. 2B. Thus, steps 203, 206, 209, and 212 are the same as in FIG. 2A, but processing is different in the last two steps. Specifically, in this scenario the result of step 212 is that a rule violation was detected by the vendor account configuration manager 118, so at step 215B the vendor account configuration manager 118 does not modify the vendor account configuration 133 per the vendor request. Next, at step 218B, the vendor account configuration manager 118 returns an indication to the vendor application 139 that the request was denied and that the configuration 133 was not modified.

Moving now to FIG. 2C, shown is a workflow scenario in which the vendor account configuration manager 118 provides a preview of the modified vendor account configuration 133. Although this embodiment combines preview generation with the use of vendor feature rules 130, in other embodiments preview generation may be implemented without vendor feature rules 130, and vice versa. Steps 203, 206, 209, and 212 are the same as in FIGS. 2A and 2B, but subsequent processing is different. Specifically, although step 215C indicates that no rule violations are detected by the vendor account configuration manager 118, the configuration is not modified immediately after rule processing. Instead, at step 218 the vendor account configuration manager 118 provides the vendor application 139 with an account preview which allows the vendor to understand the full impact of changes to the account. As part of the preview, the vendor may interact with the vendor application 139 to obtain more information about specific electronic commerce features, such as a feature description, pricing information, etc.

The preview may show which electronic commerce features will be enabled in the account after the requested modification. The preview may also show previously enabled features that will be disabled as a result of the modification. The preview may also show features which have never been selected by the vendor. Inclusion of the not-yet-selected features may be based on vendor data 136, so that particular vendors may be targeted. The preview may also show features which are not generally available or features which are in a testing phase.

Having viewed the preview information, at step 221 the vendor confirms the modification request that was sent at step 209 and approved by the vendor account configuration manager 118 at step 215C. Next, at step 224 the vendor account configuration manager 118 receives the confirmation and applies the modification to the vendor account configuration 133. Finally, at step 227 the vendor account configuration manager 118 returns an indication to the vendor application 139 that the configuration 133 was successfully modified.

Figure 3:
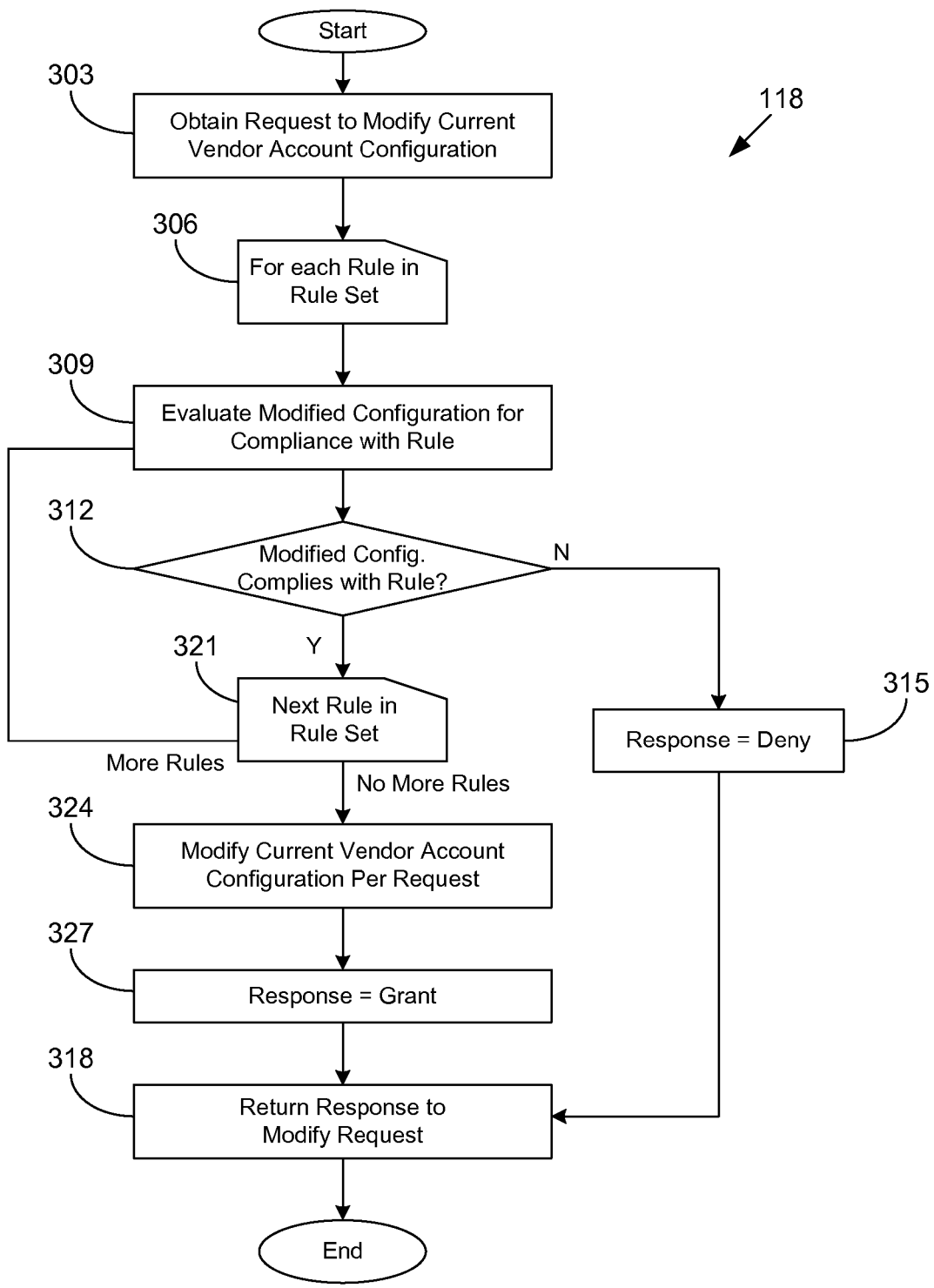
FIG. 3 is a flowchart illustrating an example of functionality implemented as portions of a vendor account configuration manager executed in a computing device in the networked environment of FIG. 1, according to various embodiments of the present disclosure.

With reference now to FIG. 3, shown is a flowchart that provides one example of the operation of a portion of the vendor account configuration manager 118 (FIG. 1) according to various embodiments. It is understood that the flowchart of FIG. 3 provides merely an example of the many different types of functional arrangements that may be employed to implement the operation of the portion of the vendor account configuration manager 118 as described herein. As an alternative, the flowchart of FIG. 3 may be viewed as depicting an example of steps of a method implemented in the computing device 103 (FIG. 1) according to one or more embodiments.

Beginning at box 303, the vendor account configuration manager 118 obtains, from the vendor application 139, a request to modify a current vendor account configuration 133. As explained above, the vendor account configuration manager 118 applies vendor feature rules 130 (FIG. 1) in order to determine whether or not to fulfill the configuration request from the vendor. At box 306 the vendor account configuration manager 118 begins an iteration loop to apply the current rule 130 to the modified account configuration 133 (FIG. 1), starting with a first rule. At box 309, the vendor account configuration manager 118 evaluates the current account configuration 133, as modified by the vendor request, for compliance with the current rule 130. Next, at box 312, the vendor account configuration manager 118 determines whether the modified account configuration 133, complies with the current rule 130. The rule 130 describes permitted interactions between vendor account features, and can take various forms.

For example, a rule 130 can list vendor account features which are not permitted to coexist, i.e., are mutually exclusive, so that a modified account configuration 133 which includes two or more features on this list is found to violate the rule 130. As another example, a rule 130 can list vendor account features which must be used together, so that a modified account configuration 133 which does not include all of the features on this list is found to violate the rule 130. A rule 130 may also indicate that it is to be conditionally applied based on vendor data 136. For example, a rule 130 requiring feature A and feature B to be used together may be applied only if the vendor data 136 indicates that the vendor requesting the modified configuration 133 has sales below a specified minimum, thus providing vendors with high sales more flexibility in their account. As another example, a rule 130 making feature A and feature B mutually exclusive may be applied only if the vendor data 136 indicates that the vendor has had a relationship with the hosted platform service provider for less than a minimum time period, thus providing long-term vendors more flexibility in their account. Application of vendor feature rules 130 can be conditioned on other types of vendor data 136, as should be appreciated.

If at box 312 it is determined that the modified configuration 133 does not comply with (i.e., violates) the current rule 130, then the vendor account configuration manager 118 moves to box 315, where a return response code is set to indicate denial of the request to modify the vendor account configuration 133. Next, at box 318 the vendor account configuration manager 118 returns, to the vendor, a response to the request to modify. The process of FIG. 3 is then complete. The response includes the return code set at box 315, and may also include a reason code which provides more information to the vendor about the reason for the denial, for example, an indication of the rule 130 which was violated.

If at box 315 it is determined that the modified configuration 133 does comply with (i.e., does not violate) the current rule 130, then the vendor account configuration manager 118 moves to box 321 to iterate to the next rule 130. If it is determined at box 321 that more rules remain, then the vendor account configuration manager 118 repeats the rule evaluation process, starting at box 309, but using the next rule 130. If it is determined at box 321 that all rules have been processed without a violation, then the vendor account configuration manager 118 moves to box 324. At box 324, having determined that the modified configuration 133 complies with all of the vendor feature rules 130, the vendor account configuration manager 118 modifies the current vendor account configuration 133 in accordance with the request received at box 303. Next, at box 327, a return response code is set to indicate that the request to modify the configuration 133 was granted. Next, at box 318 the vendor account configuration manager 118 returns, to the vendor, a response to the request to modify. The process of FIG. 3 is then complete.

In the embodiment described in connection with FIG. 3, rules 130 are applied in response to a request from a vendor to change the account configuration 133. In other embodiments, the trigger for application of a rule 130 may be creation of a new rule 130, or modification to an existing rule 130. In one such embodiment, when a new rule 130 is created or an existing rule 130 is modified, the vendor account configuration manager 118 and/or the rules engine 120 iterates through the vendor account configurations 133, and applies the new or modified rule 130 to the account configurations 133. A variety of actions may be taken if non-compliance is detected. For example, the vendor account configuration manager 118 may "grandfather in" an account configuration 133 by allowing the account configuration 133 to be non-compliant. As another example, the vendor account configuration manager 118 may change the configuration of a non-compliant account to enforce compliance, which may involve downgrading the account configuration 133 to a lowest common denominator set of features that is compliant. The vendor may be notified of the action taken by the account configuration manager 118, and different actions may be taken for different accounts, for example, using an account-specific setting.

Figure 4:
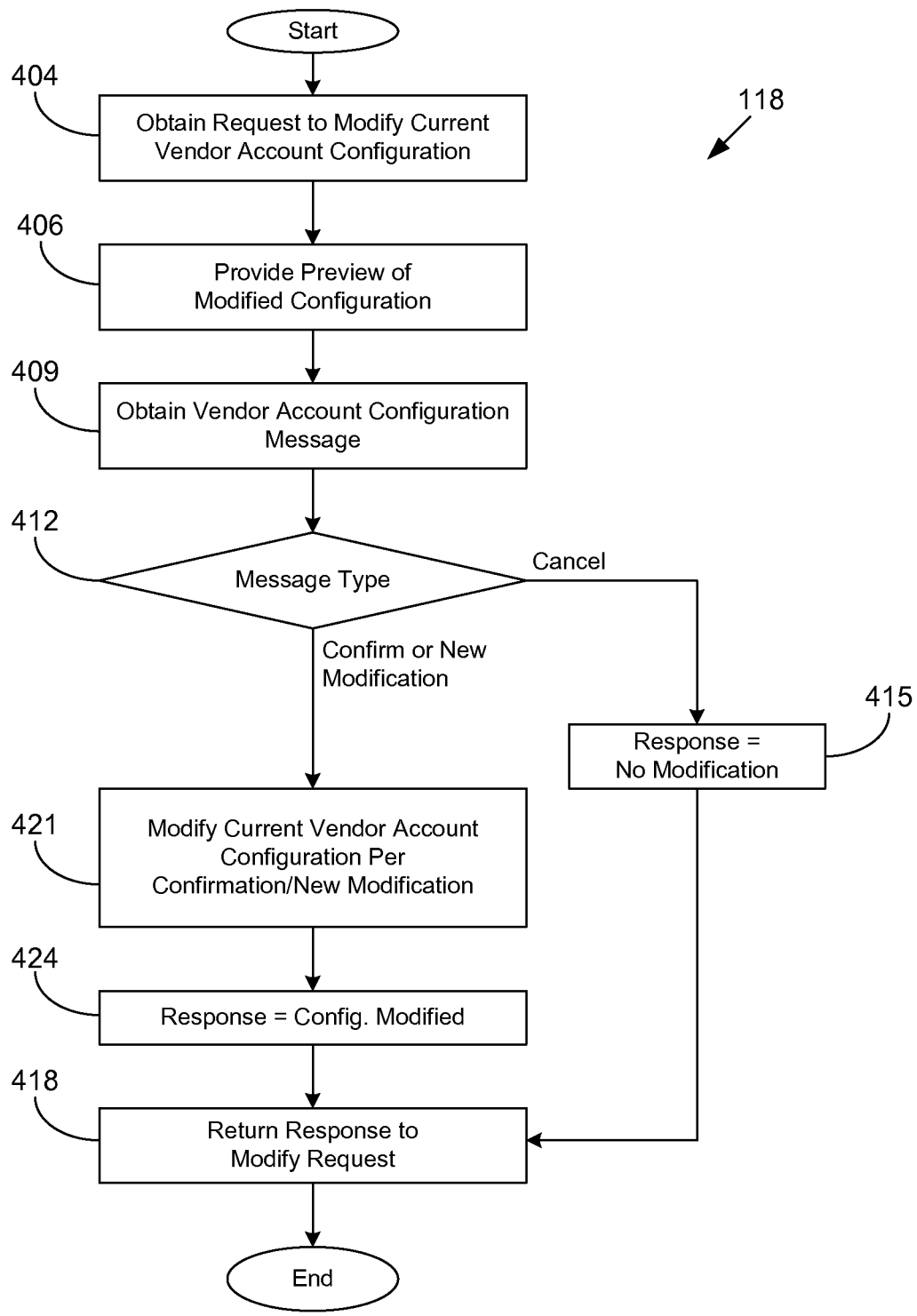
FIG. 4 is a flowchart illustrating another example of functionality implemented as portions of a vendor account configuration manager executed in a computing device in the networked environment of FIG. 1, according to various embodiments of the present disclosure.

Turning now to FIG. 4, shown is a flowchart that provides one example of the operation of a portion of the vendor account configuration manager 118 according to various embodiments. It is understood that the flowchart of FIG. 4 provides merely an example of the many different types of functional arrangements that may be employed to implement the operation of the portion of the vendor account configuration manager 118 as described herein. As an alternative, the flowchart of FIG. 4 may be viewed as depicting an example of steps of a method implemented in the computing device 103 (FIG. 1) according to one or more embodiments.

Beginning at box 403, the vendor account configuration manager 118 obtains, from the vendor application 139, a request to modify a current vendor account configuration 133. The requested modification may correspond to adding a new feature, deleting an existing feature, or modifying an existing feature. Modification of an existing feature may correspond to an upgrade or a downgrade of the feature. Next, at box 406, the vendor account configuration manager 118 provides a preview of the modification, i.e., the current account configuration 133 as modified by the vendor request.

In some embodiments, the preview is provided in the form of network page(s), which may be static, or dynamic, or include animation. In some embodiments, the preview is provided in the form of redirection to another web site which mimics the modified vendor account configuration 133 but is not made available for buyer interaction. Various embodiments of the preview will be described in further detail below.

At box 409, the vendor account configuration manager 118 obtains another message pertaining to the same account configuration 133. At box 412, the vendor account configuration manager 118 examines the message to determine the message type. If at box 412 it is determined that the message indicates that the vendor is cancelling the account modification, then processing continues at box 415. At box 415 a response code is set to indicate that the account configuration 133 will not be modified, and box 418 the vendor account configuration manager 118 returns, to the vendor, a response to the request to modify. The process of FIG. 4 is then complete.

If at box 412 it is determined that the message either confirms the account modification requested at box 403 or requests a different modification, then processing continues at box 421. At box 421, the vendor account configuration manager 118 modifies the current vendor account configuration 133 according to the modification requested at box 403, or according to the newly requested modification, depending on the result of box 412. At box 424 a response code is set to indicate that the account configuration 133 was modified, and box 418 the vendor account configuration manager 118 returns, to the vendor, a response to the request to modify. The process of FIG. 4 is then complete. In addition to a success/failure code, the response returned at box 418 may include additional information, for example, a summary of modifications made to the current vendor account configuration 133.

The preview provided at box 406 gives the vendor information about the effects that the requested modification will have on the vendor account configuration 133. The preview may describe features added by the requested modification. The preview may describe features removed by the requested modification. The preview may describe existing features changed by the modification, for example, a change in the fee structure paid by the vendor, a change in the level of service from basic to advanced, etc. The preview information thus allows the vendor to more fully understand the ramifications of the requested modification, and to then make changes to the requested modification or to cancel the request altogether. The preview provided at box 406 may allow the vendor to obtain more detailed information on a particular feature.

The preview provided by the vendor account configuration manager 118 may take advantage of vendor data 136. Examples of various categories of vendor data 136 were provided above. As one example use of the vendor data 136, if the vendor operates an electronic storefront in multiple countries and a feature in the modified vendor account configuration 133 is not available in all of these countries, the preview may emphasize that difference. As another example, the vendor data 136 can be used to emphasize advantages which specific platform features might provide to a particular vendor. For example, the preview may inform the vendor that based on the vendor's history in using an inventory management tool and/or sales data, the vendor can expect to reduce the time spent managing inventory by fifteen hours a month with the tool provided as part of the modified vendor account configuration 133.

In some embodiments, the preview also describes features that are not affected by the requested modification. In this manner, the vendor can be informed about additional features offered by the electronic commerce system provider, which may result in additional revenue for the provider. The preview may include the fee structure for any of these additional features.

These additional features may be selected by the vendor account configuration manager 118 based on vendor data 136 such as sales data, inventory data, vendor account history, vendor location, etc. In this manner, specific platform features can be offered to targeted vendors, for example, vendors with a high volume of sales, vendors in a specific geographic area, etc. For example, if the vendor operates an electronic storefront in France, the preview may show the vendor which electronic commerce features are available in Germany.

As another example, the preview may inform the vendor that based on the vendor's historical sales data, the vendor would save money by choosing the high-volume fee structure feature rather than the low-volume fee structure feature that is part of the currently proposed modification to the vendor account configuration 133. That is, the preview information provided by the vendor account configuration manager 118 may lead a vendor to modify the feature set in a different way than the vendor originally planned.

Some embodiments of the vendor account configuration manager 118 communicate with the electronic commerce application 121 and/or the data store 115 to dynamically discover new features offered by the electronic commerce platform and include these new features in the preview. A vendor may subscribe to new feature notifications, and the subscription may be limited by criteria such as price, technology, geographic region, etc. The vendor account configuration manager 118 may also take vendor data 136 into account in notifying vendors about new features available for preview. For example, high-volume vendors may be notified about one type of new feature while new vendors may be notified about another type of new feature. In some embodiments, the vendor can sign up for automatic inclusion of a new feature that has been previewed.

Figure 5:
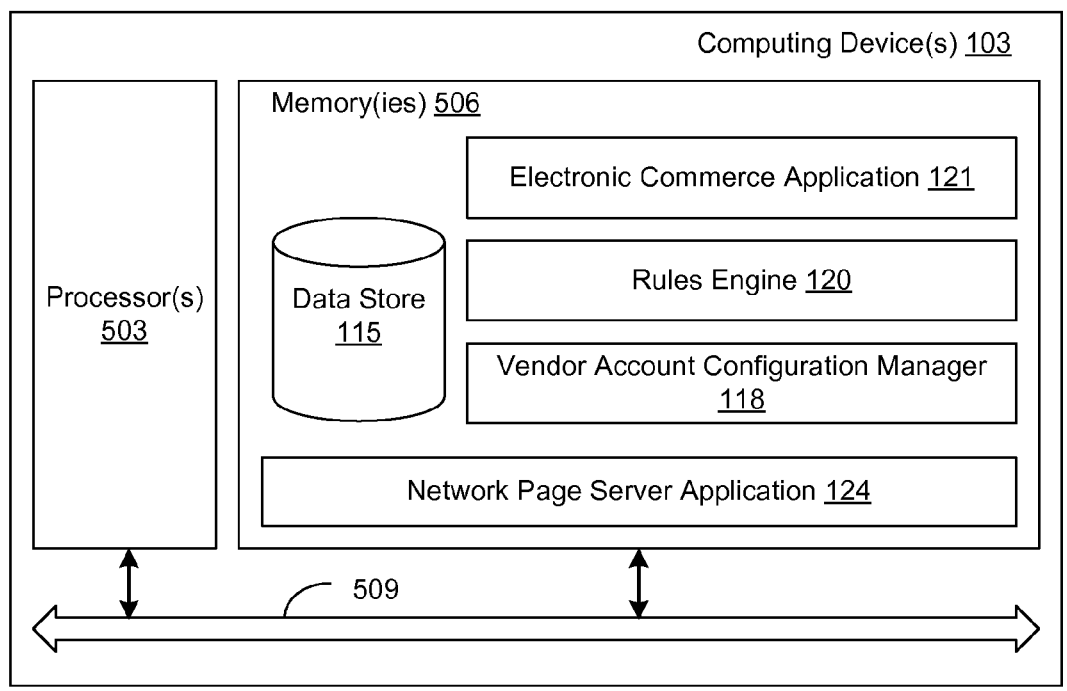
FIG. 5 is a schematic block diagram that provides one example illustration of a computing device employed in the networked environment of FIG. 1, according to various embodiments of the present disclosure.

With reference now to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the vendor account configuration manager 118, the network page server application 124, the electronic commerce application 121, and potentially other applications. Also stored in the memory 506 may be a data store 115 and other data. In addition, an operating system may be stored in the memory 506 and executable by the processor 503. While not illustrated, the computing device 112 and the client device 106 also include components like those shown in FIG. 5, whereby the browser 142 and the vendor application 139 are stored in respective memories and executable by respective processors.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the vendor account configuration manager 118, the network page server application 124, the electronic commerce application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the vendor account configuration manager 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vendor account configuration manager 118, the network page server application 124, and the electronic commerce application 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
provide a description of a current account configuration of an electronic commerce platform for an entity having an account with an electronic commerce platform provider, the electronic commerce platform being provided to the entity by the electronic commerce platform provider to facilitate an online transaction of at least one product of the entity, and the current account configuration describing a plurality of existing features provided to the entity by the electronic commerce platform provider, wherein the plurality of existing features comprises at least one of: an amount of bandwidth provided to the entity or an amount of storage space provided to the entity;
obtain a request to modify at least one of the plurality of existing features of the current account configuration;
determine whether the request to modify violates a platform feature rule;
provide a preview of a modified account configuration to the entity based at least in part on the request to modify, the preview highlighting requested modifications to the current account configuration based at least in part on the request to modify;
request a confirmation of the request to modify; and
modify at least one of the amount of bandwidth provided to the entity or the amount of storage space provided to the entity according to the request to modify in response to obtaining the confirmation of the request to modify.

2. The non-transitory computer-readable medium of claim 1, wherein providing the preview comprises encoding, for display by a browser, information describing the modified account configuration.

3. The non-transitory computer-readable medium of claim 1, wherein the plurality of existing platform features belong to a feature category, the feature category including at least one of: an order fulfillment feature, an entity listing feature, an electronic commerce marketplace feature, an electronic commerce storefront feature, an entity account setup feature, or an entity business management feature.

4. The non-transitory computer-readable medium of claim 1, wherein, when executed, the program further causes the at least one computing device to at least obtain another request to modify the current account configuration after the preview is provided, wherein the confirmation applies to the other request.

5. The non-transitory computer-readable medium of claim 1, wherein the platform feature rule determines whether a feature modification of a particular existing feature of the plurality of existing features is permitted with respect to at least one other existing feature of the plurality of existing features.

6. A method, comprising:
obtaining, via at least one of one or more computing devices, a request to modify an account configuration of an electronic commerce platform for an account holder, the electronic commerce platform being provided to the account holder by a hosted service provider to facilitate an online transaction of at least one product of the account holder, and the account configuration describing a plurality of platform features provided to the account holder by the hosted service provider, wherein the plurality of platform features comprises at least one of: an amount of bandwidth provided to the account holder or an amount of storage space provided to the account holder;
determining, via at least one of the one or more computing devices, whether the request to modify violates a platform feature rule based at least in part on the platform feature rule and at least one of the plurality of platform features; and
in response to determining that the request to modify is permitted by the platform feature rule:
providing, via at least one of the one or more computing devices, a preview of a modified account configuration to the account holder, the preview highlighting changes to the account configuration based at least in part on the request to modify; and
modifying, via at least one of the one or more computing devices, at least one of the amount of bandwidth provided to the account holder or the amount of storage space provided to the account holder.

7. The method of claim 6, wherein the modifying is performed in response to receiving a confirmation of the request to modify the account configuration.

8. The method of claim 6, wherein the preview includes information about another platform feature added by the request to modify.

9. The method of claim 6, wherein the preview includes information about a platform feature of the plurality of platform features removed by the request to modify.

10. The method of claim 6, wherein the preview includes information about a platform feature of the plurality of platform features changed by the request to modify.

11. The method of claim 6, wherein the preview includes information about a platform feature of the plurality of platform features unaffected by the request to modify.

12. The method of claim 11, further comprising using vendor-specific data to select the platform feature unaffected by the request to modify.

13. The method of claim 6, wherein the plurality of platform features further comprise at least one of an order fulfillment feature, a vendor listing feature, an electronic commerce marketplace feature, an electronic commerce storefront feature, an electronic commerce platform branding feature, a vendor account setup feature, or a vendor business management feature.

14. A system, comprising:
at least one computing device; and
at least one application executed in the at least one computing device, the at least one application causing the at least one computing device to at least:
obtain a request to modify an account configuration of an electronic commerce platform for an account holder, the electronic commerce platform being provided to the account holder by a hosted service provider to facilitate an online transaction of at least one product of the account holder, the account configuration describing at least one platform feature provided to the account holder by the hosted service provider, wherein the at least one platform feature comprises at least one of: an amount of bandwidth provided to the account holder or an amount of storage space provided to the account holder;
determine whether the request to modify violates a platform feature configuration rule based at least in part on the platform feature configuration rule and the at least one platform feature; and
in response to determining that the request to modify is permitted by the platform feature configuration rule:
provide a preview of a modified account configuration to the account holder, the preview highlighting requested changes to the account configuration based at least in part on the request to modify; and
modify at least one of the amount of bandwidth provided to the account holder or the amount of storage space provided to the account holder, in response to receiving a confirmation to modify.

15. The system of claim 14, wherein the at least one application further causes the at least one computing device to at least obtain another request to modify the account configuration after the preview is provided, wherein the confirmation applies to the other request.

16. The system of claim 14, wherein the request to modify comprises an addition request to add another platform feature to the account configuration.

17. The system of claim 14, wherein the request to modify comprises a modification request to modify at least one of the at least one platform feature in the account configuration.

18. The system of claim 14, wherein the request to modify comprises a removal request to remove at least one of the at least one platform feature from the account configuration.

19. The system of claim 14, wherein the platform feature configuration rule includes an account holder characteristic.

20. The system of claim 19, wherein the account holder characteristic comprises at least one of vendor sales data or vendor inventory data.

* * * * *